(12) United States Patent
Roquemore, III

(10) Patent No.: US 7,556,200 B1
(45) Date of Patent: Jul. 7, 2009

(54) METHODS AND APPARATUS FOR REDUCING THE INFLUENCE OF NOISE IN AN OPTICAL SCANNING SYSTEM

(75) Inventor: John P. Roquemore, III, Snellville, GA (US)

(73) Assignee: NCR Corporation, Dayton, OH (US)

( * ) Notice: Subject to any disclaimer, the term of this patent is extended or adjusted under 35 U.S.C. 154(b) by 315 days.

(21) Appl. No.: 11/315,819

(22) Filed: Dec. 22, 2005

(51) Int. Cl.
   *G06K 7/10* (2006.01)
(52) U.S. Cl. .............................. 235/462.29; 235/462.38
(58) Field of Classification Search ................................
   235/462.01–462.49
   See application file for complete search history.

(56) References Cited

U.S. PATENT DOCUMENTS 5,504,318 A * 4/1996 Joseph et al. ............... 235/454
6,454,169 B1 * 9/2002 Belknap et al. ............ 235/462.4
6,637,656 B2 * 10/2003 Kurogama et al. ...... 235/462.25

\* cited by examiner

*Primary Examiner*—Jamara A Franklin
(74) *Attorney, Agent, or Firm*—Priest & Goldstein PLLC; Paul W. Martin

(57) ABSTRACT

Systems and techniques for eliminating or compensating for noise affecting a bar code scanner. A scanner is operated in a learning mode under conditions designed to insure that a scan signal will take on predictable characteristics and noise affecting the scan signal will be easily detectable. During the learning mode, information relating to noise affecting the scan signal and the conditions under which the noise occurs is stored. During normal operation of the scanner, the stored noise information is used in controlling operation of the scanner so as to eliminate or compensate for noise under conditions in which noise has been shown to be susceptible to occur.

14 Claims, 2 Drawing Sheets

METHODS AND APPARATUS FOR REDUCING THE INFLUENCE OF NOISE IN AN OPTICAL SCANNING SYSTEM

FIELD OF THE INVENTION

The present invention relates generally to improvements in optical bar code scanning and the like. More particularly, the invention relates to improved systems and techniques detecting noise occurring during an optical scan and preventing the occurrence or minimizing the influence of such noise.

BACKGROUND OF THE INVENTION

Optical scanning, and in particular bar code scanning, is widely used in a variety of applications. In retail checkout applications in particular, a high throughput is often highly desirable. In order to achieve a high throughput, efficient decoding of bar codes is important. The occurrence of noise is a significant factor impairing the efficiency of efficient decoding. In some cases, noise influences may be mistaken for transitions in a bar code signal, thereby introducing decoding errors, requiring detection of such errors and possible repetition of a scan attempt. In other cases, noise influences may be identified, but require devotion of processing resources to identifying and compensating for the noise influences.

Most or all bar code scanners introduce noise into a scan at the occurrence of particular events that occur at predictable times during the scan. These events include mirror edge transitions as a laser beam strikes a spinning polygonal mirror used to generate scan beams, retro-reflections, noise resulting from irregularities in mirror surfaces as a laser beam or scan beam strikes these irregularities, noise resulting from the striking of irregular surfaces by reflected light reentering the scanner. These surfaces may include electronic circuit boards within the scanner. Numerous other possible events causing noise may occur. Many of these events occur at predictable times during generation of a scan pattern.

SUMMARY OF THE INVENTION

Among its several aspects, the present invention addresses such difficulties by identifying the pattern or times of the occurrence of noise during generation of a scan pattern and processing of light entering the scanner to decode a bar code. At suitable times, such as during final assembly of the scanner, installation of the scanner, or periodically during use of the scanner, the scanner is operated in a learning mode in which the pattern or times of the occurrence or occurrences of noise during generation of a scan pattern and detection of light reentering the scanner are detected. More particularly, the times at which noise occurs on a repeating basis are identified, and suitable steps are taken during subsequent operation of the scanner to eliminate the occurrence of noise or to compensate for or otherwise minimize the occurrence of noise. These steps may include, for example, deactivation of the laser at times at which noise has been identified as occurring, deactivating detection of light entering the scanner or otherwise ignoring such light, or identifying signals generated at particular times as noise and rejecting consideration of such signals in decoding.

A more complete understanding of the present invention, as well as further features and advantages of the invention, will be apparent from the following Detailed Description and the accompanying drawings.

DETAILED DESCRIPTION

Figure 1:
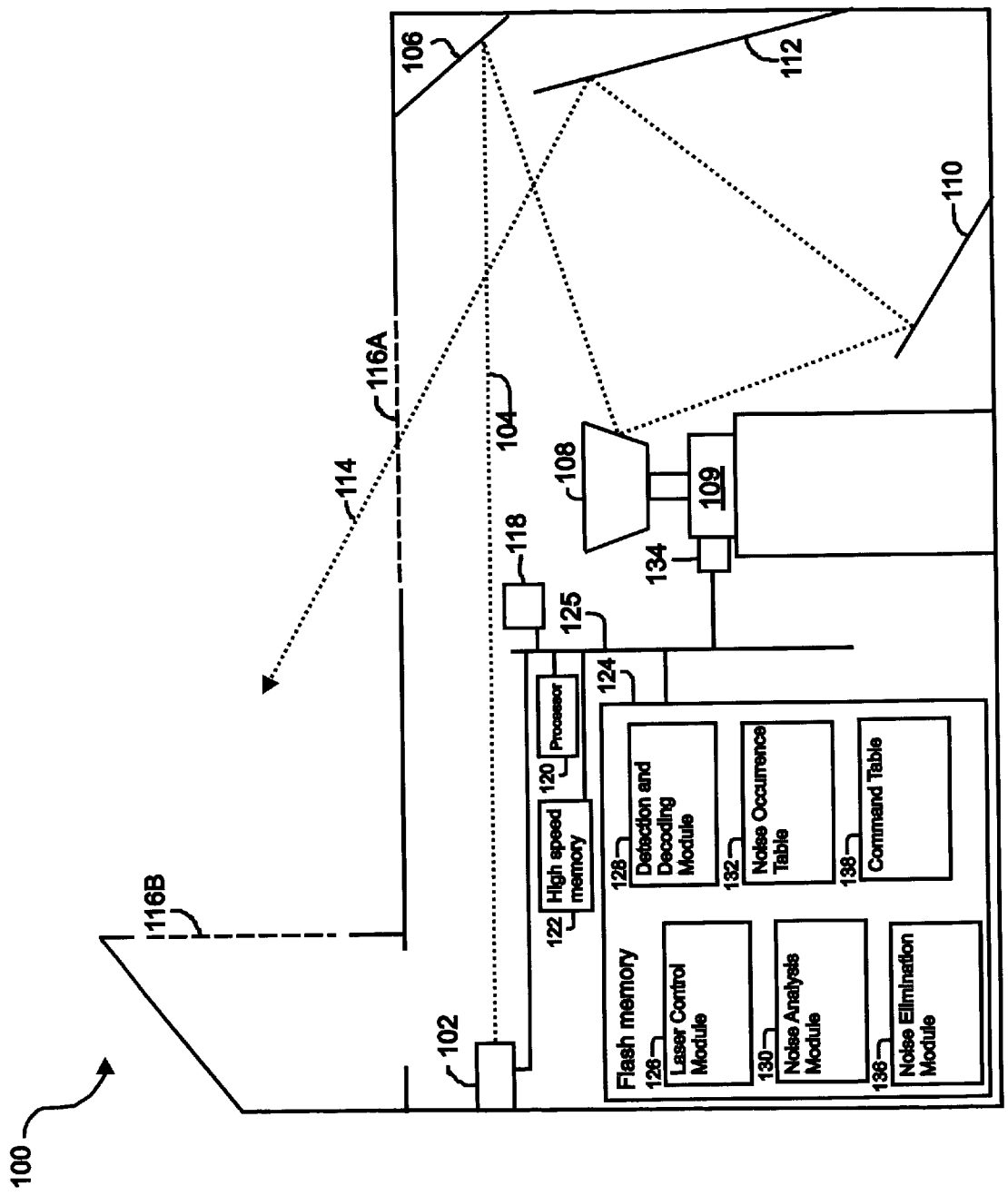
FIG. 1 illustrates a bar code scanner according to an aspect of the present invention.

FIG. 1 illustrates a bar code scanner 100 according to an aspect of the present invention. The scanner 100 includes a laser 102 emitting a laser beam 104. The laser beam 104 is directed to a deflector mirror 106 and is reflected to strike a rotating polygonal spinner 108, which is rotated by a spinner motor 109. The scanner 100 includes a set of primary mirrors of which a primary mirror 110 is illustrated here, as well as a set of secondary mirrors of which a secondary mirror 112 is illustrated here. While the present exemplary scanner 100 includes primary and secondary mirrors, it will be recognized that this specific configuration is not required and that the present invention may be practiced using scanners using any desired technique for producing scan patterns, such as the use of only primary mirrors in addition to a spinner, or the generation of scan patterns using a spinner alone without any fixed mirrors.

Once the laser beam 104 is reflected from the spinner 108, it is directed to one of the primary mirrors and from there to one of the secondary mirrors. Here, the laser beam 104 is shown as traveling from the spinner 108 to the primary mirror 110 and then to the secondary mirror 112. Once the laser beam 104 is reflected from a secondary mirror, it is conveniently called a scan beam 114, and is directed to and out of one of the scan windows 116A and 116B. As the spinner 108 rotates, the angle of reflection of the laser beam 104 from the spinner 108 changes, causing the laser beam 104 and the scan beam 114 to move. The rotation of the spinner 108 causes the scan beam 114 to move across the scan window from which it is emitted, causing it to trace out a scan line. In addition, the rotation of the spinner 108 and the change of the spinner facet from which the laser beam 104 is reflected causes the path traveled by the laser beam 104 to change, so that the laser beam 104 is reflected from different sets of primary and secondary mirrors, causing the position of the scan beam 114 to change so that it traces out different scan lines, and causing the scan beam 114 to be emitted from different ones of the scan windows 116A and 116B. During each rotation of the spinner 108, a scan pattern emerges from each of the scan windows 116A and 116B, each scan pattern being created through the tracing out of a plurality of scan lines emerging from the scan window.

The scanner 100 also includes a photodetector 118. The photodetector 118 produces an electrical signal, suitably referred to as a scan signal, when struck by light. The scan signal is processed to extract bar code information from light resulting from the reflection of a scan pattern from a bar code into one of the scan windows 116A and 116B and back to the photodetector 118.

The scanner 100 suitably includes data processing resources in order to control the operation of the scanner 100, such as generation of scan patterns and processing of light reflected back into the scanner 100. The data processing resources include a processor 120, high speed memory 122, and relatively long term memory such as flash memory 124, communicating with one another and with various elements of the scanner 100 through a bus 125. The scanner 100 implements various modules to control generation of scan patterns and processing of reflected light to decode bar codes. These modules are suitably hosted in the flash memory 124 and transferred to high speed memory 122 as needed for execution by the processor 120. The modules include a laser control module 126 and a detection and decoding module 128. In addition, the flash memory 124 hosts a noise analysis module 130 to identify times at which events occur on a repeating basis that tend to introduce noise into the scan signal, so that the laser control module 126 and the detection and decoding module 128 may prevent the occurrence of such noise, or alternatively may compensate for the influences of noise.

Various factors and events may introduce noise affecting the scan signal and making bar code detection and decoding more difficult when such noise is present. Noise may be produced as a result of events affecting the laser beam as it travels through the scanner 100, and the scan beam 114 as it travels out of the scanner. Noise may also be produced as a result of reflected light as it enters the scan windows 116A and 116B and is reflected within the scanner 100 and strikes the photodetector 118. The detection and decoding module 128 typically identifies crossings of a threshold by the scan signal in order to identify transitions between light and dark areas of a bar code. The introduction of noise into the scan signal is likely to interfere with crossings of a threshold caused by transitions in a bar code, or to introduce extraneous crossings of the threshold that are not caused by transitions in a bar code. Such noise is likely to introduce errors which will then require correction or may even introduce erroneous results, or to require processing time to prevent misinterpretation of noise influences. Many events that are likely to introduce noise occur at predictable times, particularly with respect to the position of the spinner 108.

For example, edge transitions occurring as the spinner 108 rotates in the path of the laser beam 104 occur at such predictable times, as do the passing of irregularities in surfaces of the spinner 108 in the front of the laser beam 104. Stray reflections as the laser beam 104 is reflected along various paths within the scanner 100 may also introduce noise at predictable times. Numerous other factors may introduce noise into the scan signal.

Therefore, the scanner 100 is designed and programmed so that it can be operated in a learning mode at suitable times, such as at final testing of the scanner 100 during a manufacturing process, installation of the scanner 100 in a retail location, or periodically during use of the scanner. During operation in the learning mode, the scanner 100 may suitably be operated under conditions in which noise is readily identifiable. For example, the scanner 100 may be operated with the scan windows 116A and 116B shielded with a material such as black felt, in order to prevent external light from entering the scanner 100 and to insure that the only factors inducing variation in a scan signal will be stray noise influences created by the scanner 100 itself. Under such circumstances, the scan signal will typically be predicted to take on a single, stable value, so that deviations from that value may easily be identified as noise.

During such operation, the noise analysis module 130 is invoked in order to detect noise appearing in the scan signal and to identify the times at which the noise occurs. The noise analysis module 130 examines the scan signal and identifies significant deviations from a predicted value as noise. The noise analysis module 130 notes the time at which this noise occurs, in relation to measurable factors such as time or a rotational position of the spinner 108. Suitably, the noise analysis module performs the examination over a number of rotations of the spinner 108, and builds a noise occurrence table 132, noting occurrences of noise and beginning and ending times of noise occurrences. The occurrences may suitably be noted in relation to rotational positions of the spinner 108, because the rotational position of the spinner 108 is likely to be the most predictable condition tied to occurrences of noise. This information may be received from a sensor, such as a Hall sensor 134, connected to the motor 109 used to rotate the spinner 108. The information from the Hall sensor 134 may suitably be examined to determine when the spinner 108 is in a predetermined reference position and then timing information may be used to determine the position of the spinner 108 throughout its rotation.

If the spinner 108 has a known rate of rotation, the position of the spinner 108 can be determined by using the timing information to determine the displacement of the spinner 108 from the position indicated by the Hall sensor 134. On the other hand, if the Hall sensor 134 is able to identify the position of the spinner 108 with sufficient precision throughout its rotation, the information provided by the Hall sensor 120 can be used to determine the position of the spinner 108 throughout its rotation. Alternative techniques may be used to determine when the spinner 108 is in a reference position. For example, a synchronization label may be read to determine a reference position of the spinner 108 and then timing information can be utilized to determine the displacement of the spinner from the reference position in a known manner. Details of such use of a synchronization label are disclosed in Blanford U.S. Pat. No. 6,220,513 and Blanford U.S. Pat. No. 6,347,741, assigned to the common assignee of the present invention and incorporated herein by reference in their entirety.

Alternatively, a scanner may employ a diffractive element to diffract a laser beam reflected from a spinner such as the spinner 108 when the spinner is in a reference position, such that the diffracted beam strikes a reference position photodetector to produce a reference position photosignal used to calibrate the position of the spinner. Details of such determination of a spinner position using a photosignal produced by a diffracted beam are disclosed in Belknap U.S. Pat. No. 6,454,169, assigned to the common assignee of the present invention and incorporated herein by reference in its entirety.

Once the noise occurrence table 132 has been constructed, it may then be used by a noise elimination module 136. The noise elimination module 136 performs appropriate actions to eliminate or minimize the effects of noise during the time that noise has been shown to occur. For example, the noise elimination module 136 may direct shutting down of the laser 102 during noise occurrences or may inhibit detection of light by the photodetector 118 during noise occurrences. As a further alternative, the noise elimination module 136 may retrieve information about the noise element of the signal generated at the time of a noise occurrence and pass it to the detection and decoding module 128, in order to allow the detection and decoding module 128 to more easily compensate for or otherwise eliminate the effects of noise. For example, an entry for a noise occurrence may include a waveform of the detected noise, or numerical information analogous to a waveform of the detected noise. This information may be subtracted from the scan signal, or otherwise suitably compensated for in processing or analysis of the scan signal, in order to remove the effects of the noise occurrence from the scan signal. If desired, for example, in order to achieve faster operation, the noise elimination module 136 may construct a command table 138, used to control operation of the scanner and directing appropriate actions determined to be suitable to reduce or eliminate noise. For example, the command table 138 may specify times to deactivate and reactivate the laser 102 or the photodetector 118. For example, the command table 138 may include rotational positions of the spinner, with actions to be taken at each specified position. For example, the command table 138 may include a command to turn the laser 102 off at a position that is known to be just before an edge transition and off at a position that is known to be just after an edge transition. For example, of positions are stated in terms of ten-thousandths of a revolution, the command table 138 might include the following command lines:

3340—LASER OFF
3370—LASER ON when an edge transition is present between 3341 and 3369 ten-thousandths of a revolution. The command table 138 may include appropriate commands for avoiding or compensating for each occurrence of noise. By using such a table, control of the scanner may simply be based on considerations of timing or spinner position, rather than requiring the noise elimination module 136 to identify the risk of noise and issue a command to take appropriate action to eliminate the noise.

Figure 2:
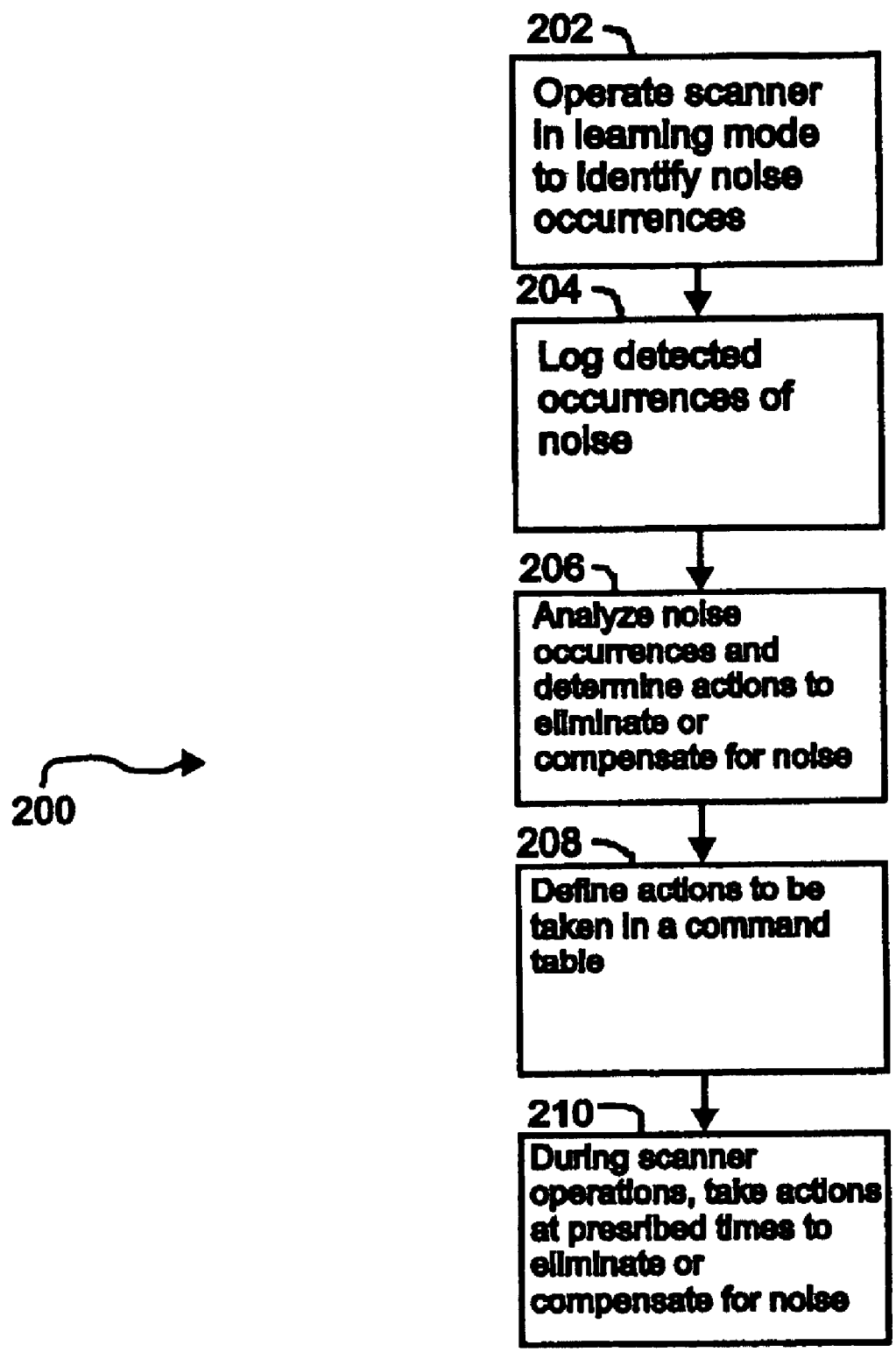
FIG. 2 illustrates a process of noise elimination and compensation in bar code scanning according to an aspect of the present invention.

FIG. 2 illustrates a process 200 of noise elimination and compensation in bar code scanning, according to an aspect of the present invention. The process 200 may suitably be performed using a scanner similar to the scanner 100 of FIG. 1. At step 202, a bar code scanner is operated in a learning mode in order to identify the occurrences of noise caused by predictable conditions relating to the operation of the scanner. In the learning mode, the scanner is suitably operated under conditions resulting in a stable or predictable scan signal, so that any deviations from the predicted scan signal can be presumed to be the result of noise. At step 204, detected occurrences of noise are logged and correlated with predictable events or conditions, such as specified times or rotational positions of a rotating spinner within the scanner. Suitably, the occurrences of noise are correlated with conditions occurring on a repeating cycle, and detected occurrences of noise are analyzed to determine whether they recur repeatedly as the conditions with which they are correlated recur. For example, if a noise occurrence is correlated with a rotational position of the spinner, the occurrence of noise is examined over several rotations of the spinner to determine if the noise repeats at the same rotational position in several rotations. If noise occurs only on one rotation, it may be discarded as stray noise, or if it occurs only occasionally, it may be discarded as difficult to predict. On the other hand, noise that occurs consistently under repeating conditions is logged.

At step 206, the noise and the conditions under which it occurs are analyzed and choices are made for actions to eliminate or compensate for noise occurrences. For example, if it can be determined that noise occurs as a laser beam within the scanner strikes a mirror edge of the spinner, the best technique for eliminating this noise may be deactivation of the laser during a brief window around this time. Noise from reflections may be best eliminated by deactivating or ignoring a scan signal produced when a photodetector is struck by light entering the scanner. Other noise may be compensated for in processing, for example, by subtracting or otherwise compensating for signal elements that are attributed to noise.

As an alternative to defining actions to be taken depending on an analysis of the nature and likely cause of each noise occurrence, it is also possible to take a single action or one of a predefined selection of actions to eliminate or compensate noise, such as deactivating the laser at every time interval during which noise was detected during the learning mode, deactivating generation of a scan signal during such time intervals, or a combination of these and other suitable actions.

At step 208, the actions to be taken may be defined in a command table specifying the actions to be taken and the time intervals, scanner rotational positions, or other times or conditions defining actions to be taken. At step 210, during operation of the scanner, appropriate actions are taken to eliminate or compensate for noise, for example, by operating the scanner under the control of the command table defined in step 208 or, if no such table has been defined, identifying times or conditions at which noise occurred during the learning mode and taking appropriate actions at those times.

While the present invention is disclosed in the context of a presently preferred embodiment, it will be recognized that a wide variety of implementations may be employed by persons of ordinary skill in the art consistent with the above discussion and the claims which follow below.

I claim:

1. A bar code scanner comprising:
a laser for emitting a laser beam;
a rotating spinner for reflecting the laser beam, the rotating spinner being placed and configured such that when the laser beam is reflected from the spinner and to and out of a scan window, the rotation of the spinner will direct the laser beam such that the laser beam sweeps across the scan window to form a scan line;
a photodetector for creating a scan signal when struck by reflected light entering the scan window; and
a processor for processing the scan signal to extract bar code information from the scan signal generated by a reflection of the scan line from a bar code, the processor being operative to refer to stored noise information identifying noise and conditions under which noise is susceptible to occur including information relating to rotational positions of the spinner during which each instance of noise occurs and to control the operation of the scanner so as to minimize occurrences and influences of noise during conditions under which noise is susceptible to occur.

2. The scanner of claim 1, wherein the stored noise information is collected during a learning mode in which the scanner is operated under conditions producing a scan signal with known and stable characteristics.

3. The scanner of claim 2, wherein the stored noise information includes identification of each instance of noise during the learning mode.

4. The scanner of claim 3, wherein the stored noise information is collected over a number of rotations of the spinner in order to distinguish noise that recurs at predictable times against noise that does not recur at predictable times.

5. The scanner of claim 3, wherein the processor is operative to deactivate the laser at selected times when the stored noise information indicates that noise is susceptible to occur.

6. The scanner of claim 3, wherein the processor is operative to deactivate generation of the scan signal by the photodetector at selected times when the stored noise information indicates that noise is susceptible to occur.

7. The scanner of claim 3, wherein the processor is operative to ignore the scan signal at selected times when the stored noise information indicates that noise is susceptible to occur.

8. The scanner of claim 3, wherein the processor is operative to retrieve noise information identifying characteristics of an instance of noise from the stored noise information and to perform processing so as to compensate for the occurrence of that instance of noise in the scan signal at times when that instance of noise is susceptible to occur.

9. A method of noise elimination and compensation in bar code scanning, comprising the steps of:
- operating a bar code scanner in a learning mode in which a scan signal generated by light striking a photodetector within the bar code scanner has predictable characteristics in the absence of noise;
- while the scanner is being operated in the learning mode, identifying noise affecting the scan signal and storing noise information relating to each instance of noise and conditions under which the noise is susceptible to occur including information relating to rotational positions of a reflective spinner during which each instance of noise occurs; and
- during normal scanner operation, using the stored noise information to control operation of the scanner so as to eliminate or compensate for noise during conditions under which the stored noise information indicates that noise is susceptible to occur.

10. The method of claim 9, wherein the step of identifying noise and storing noise information the stored noise information is performed over a number of rotations of the spinner in order to distinguish noise that recurs at predictable times against noise that does not recur at predictable times.

11. The method of claim 9, wherein the step of controlling the scanner so as to eliminate or compensate for the occurrence of noise includes deactivating a laser used in generating scan patterns at selected times when the stored noise information indicates that noise is susceptible to occur.

12. The method of claim 9, wherein the step of controlling the scanner so as to eliminate or compensate for the occurrence of noise includes deactivating a photodetector used to generate the scan signal at selected times when the stored noise information indicates that noise is susceptible to occur.

13. The method of claim 9, wherein the step of controlling the scanner so as to eliminate or compensate for the occurrence of noise includes ignoring the scan signal at selected times when the stored noise information indicates that noise is susceptible to occur.

14. The method of claim 9, wherein the step of controlling the scanner so as to eliminate or compensate for the occurrence of noise includes using stored noise information relating to characteristics of an instance of noise to compensate for noise predicted to affect the scan signal at selected times when the stored noise information indicates that noise is susceptible to occur.

* * * * *